United States Patent [19]

Reichert et al.

[11] Patent Number: 4,902,730

[45] Date of Patent: Feb. 20, 1990

[54] FIBRE REINFORCED POLYPHENYLENE SULPHIDE

[75] Inventors: Karl-Heinz Reichert; Ingo Koschinski, both of Berlin, Fed. Rep. of Germany

[73] Assignee: Bayer Aktiengesellschaft, Leverkusen, Fed. Rep. of Germany

[21] Appl. No.: 232,013

[22] Filed: Aug. 15, 1988

[30] Foreign Application Priority Data

Aug. 27, 1987 [DE] Fed. Rep. of Germany ....... 3728602

[51] Int. Cl.[4] ......................... C08K 9/04; C08L 81/04

[52] U.S. Cl. .................................... 523/215; 523/200; 523/217; 524/609; 524/881; 525/537; 528/388

[58] Field of Search ....................... 523/200, 215, 217; 524/609, 881; 525/537

[56] References Cited

U.S. PATENT DOCUMENTS

| | | | |
|---|---|---|---|
| 4,657,945 | 4/1987 | Reichert et al. | 523/217 |
| 4,710,546 | 12/1987 | Reichert et al. | 523/200 |
| 4,735,977 | 4/1988 | Bier et al. | 528/388 |

*Primary Examiner*—John C. Bleutge
*Assistant Examiner*—David W. Woodward
*Attorney, Agent, or Firm*—Connolly and Hutz

[57] ABSTRACT

Improved fiber reinforcement of polyarylene sulphides is achieved by preparing the polyarylene sulphides in the presence of reinforcing fibers pretreated with arylsulphonic acid chlorides at elevated temperatures.

8 Claims, No Drawings

FIBRE REINFORCED POLYPHENYLENE SULPHIDE

This invention relates to fibre reinforced polyphenylene sulphide and to a process for its preparation.

It is known to carry out the polymerisation reaction of dihalogenbenzenes and sulphur compounds for the preparation of polyphenylene sulphide in the presence of chemically activated fibres and fillers (DE-OS 3 426 918).

This process could be further developed by using certain organic acid chlorides for activating the fibres.

The present invention therefore relates to fibre reinforced polyphenylene sulphide, characterised in that the polycondensation for the preparation of polyphenylene sulphide is carried out in the presence of fibres which have been chemically activated with arylsulphonic acid chloride.

Arylsulphonic acid chlorides are used for chemically activating the fibres. The compound preferably used is p-chlorobenzene sulphonic acid chloride.

The polycondensation for preparing the polyphenylene sulphide may be carried out by a method analogous, for example, to those disclosed in US-PS 3 354 129,3 876 592, 2 513 188 and 2 538 941, DE-AS 2 453 749 and DE-OS 2 623 333.

For the preparation of polyphenylene sulphides which are reinforced with fibres according to the invention, the chemically activated fibres are added to the reaction solution containing the dihalogenbenzene, optionally a trihalogenated aromatic compound, catalyst and solvent, and polymerisation is then carried out.

This invention further relates to a process for the preparation of branched or unbranched reinforced polyarylene sulphides from (a) 50–100 mol-% of dihalogenated aromatic compounds corresponding to formula (I)

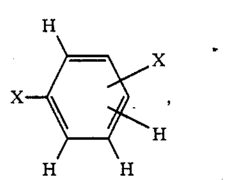

(I)

and 0-50 mol-% of dihalogenated aromatic compounds corresponding to formula (II)

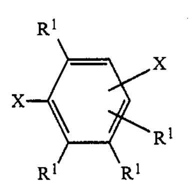

(II)

in which

X stands for halogen atoms such as chlorine or bromine which are in the meta- or para-position to one another and the $R^1$s, which may be identical or different, may stand for hydrogen, alkyl, cycloalkyl, aryl, alkylaryl or arylalkyl or two $R^1$s in the orthoposition to one another may be joined together to form an aromatic or heterocyclic ring, and one of the $R^1$s is always different from hydrogen, and (b) 0–3 mol-%, preferably 0.1 to 2.9%, preferably 0.4 to 2.4 mol-%, based on the sum of the dihalogenated aromatic compounds of formulae I and II, of a trior or tetrahalogenated aromatic compound corresponding to formula (III)

$$ArX_n \qquad \text{(III)}$$

wherein

Ar denotes an aromatic or heterocyclic group,

X stands for a halogen such as chlorine or bromine and n stands for 3 or 4, and (c) alkali metal sulphides, preferably sodium or potassium sulphide or mixtures thereof, preferably in the form of their hydrates or aqueous mixtures, optionally together with alkali metal hydroxides such as sodium or potassium hydroxide, using a molar ration of (a+b):c in the range of from 0.85:1 to 1.15:1, in an organic solvent, optionally with the addition of catalysts and/or cosolvents, characterised in that fibres which have been chemically activated with arylsulphonic acids are added to the reaction mixture and the reaction is carried out at a temperature of 160° C. to 320° C., preferably ta 165° C. to 270° C.

The usual catalysts may be used for this reaction in the usual quantities, for example alkali metal fluorides or alkali metal carboxylates (e.g. DE-PS 2 453 748, US-PS 3 354 129).

Cosolvents such as, for example, N,N-dialkyl-carboxylic acid amides of $C_1$–$C_8$-aliphatic and $C_6$–$C_{12}$-aromatic carboxylic acids are optionally used in a quantity of from 0.02 to 1.0 mol, based on 1 mol of alkali metal sulphide.

$R^1$ in formula II preferably stands for hydrogen, $C_1$–$C_{20}$-alkyl, $C_5$–$C_{20}$-cycloalkyl, $C_6$–$C_{24}$-aryl, $C_7$–$C_{24}$-alkylaryl or $C_7$–$C_{24}$-aralkyl. Two groups $R^1$ in the orthoposition to one another may also be joined together to form a condensed aromatic ring with a total of 6 carbon atoms or a condensed heterocyclic ring with 5 to 6 ring atoms and 1 to 3 hetero atoms such as N, O or S.

Ar in formula (III) preferably stands for an aromatic group containing 6 to 24 carbon atoms or a heterocyclic group containing 6 to 24 ring atoms and is most preferably an aromatic group containing 6 to 10 carbon atoms or a heterocyclic group containing 6 to 10 ring atoms, and the heterocyclic groups may contain up to 3 hetero atoms such as N, S or O.

Alkali metal sulphides are used in the usual quantities and in the usual manner. Sodium and potassium sulphide (hydrates), for example, are suitable but alkali metal sulphides prepared from hydrogen sulphides with aqueous alkali metal hydroxides such as NaOH and KOH may also be used. In all these cases, mixtures of the sulphides and mixtures of the hydroxides may be used.

The alkali metal sulphides may be dehydrated by the usual methods in one or more steps, for example by removal of the water from the reaction solution by distillation. Dehydration need not be complete for the process according to the invention. Partial dehydration may be carried out e.g. before addition of the dihalogen compound of formula (I) or (II).

If N,N-dialkylcarboxylic acid amides are used as cosolvents, they are preferably added before dehydration of the alkali metal sulphides although they may also be added to the dehydrated reaction mixture together with the polyhalogen compounds.

The components may be added together in any desired sequence. The dihalogen aromatic compounds of formula$_e$(I) and (II), the tri- and tetrahalogen aromatic compounds of formula (III) and the chemically activated fibres may be added either together or separately and either continuously or portionwise or all at once to the alkali metal sulphide or to the solvent or a part thereof. Thus, for example, the alkali metal sulphides may be added to the compounds of formulae (I), (II) and (III) together with the solvent or a part thereof or all the components may be added together at once. Any other combination of addition of components may equally well be used.

Mixtures of meta- and para-dihalogen aromatic compounds of formulae (I) and (II) may be used according to the invention. In such cases, the molar ration m:p should be at the most 30:70.

p-Dihalogen aromatic compounds are particularly preferred for the preparation of polyphenylene sulphides which can be worked up thermoplastically.

The following are examples of dihalogen aromatic compounds of formula (I) to be used according to the invention: p-Dichlorobenzene, p-dibromobenzene, 1-chloro4-bromobenzene, 1,3-dichlorobenzene and 1,3-dibromobenzene. They may be used separately or as mixtures. 1,4-Dichlorobenzene and/or 1,3-dichlorobenzene are particularly preferred.

The following are examples of dihalogen aromatic compounds of formula (II) to be used according to the invention: 2,5-Dichlorotoluene, 2,5-dichloroxylene, 1-ethyl-2,5-dichlorobenzene, 1-ehtyl-2,5-dibromobenzene, 1-ehtyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene amd 1-cyclohexyl-3,5-dichlorobenzene. These compounds may be used singly or as mixtures with one another.

The following are examples of tri- and tetrahalogenated aromatic compounds of formula (III) to be used according to the invention: 1,2,3-Trichlorobenzene, 1,2,4-trichlorobenzene, 1,2,4-tribromobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,3'-4,4'-tetrachlorobiphenyl and 1,3,5-trichlorotriazine, etc.

For preparing branched polyarylene sulphides, at least 0.1 mol-% of a trihalogenated or tetrahalogenated aromatic compound of formula (III) should be used.

The reaction according to the invention is carried out at a temperature from 160° C. to 320° C., preferably from 165° C. to 270° C., optionally under a pressure of up to $10^3$ Pa.

Chemically activated fibres are added to the reaction mixture. The following are examples of suitable fibres: Pitch fibres (Type P-M 104 T[R], Sigri/Meitingen), aramide fibres such as Kevlar fibres[R](Dupont), carbon fibres based on PAn (e.g. SIGRAFIL[R]SFC 0.5 of SIGRI/Meitingen) etc.

Materials such as silicates, aluminosilicates (e.g. mica, asbestos, kaolin, talc), calcium silicates and the like (e.g. US-PS 4 425 384) may be added as fillers, singly or as mixtures.

The fibres are activated by a preliminary treatment with arylsulphonic acid chlorides in a suspending agent (e.g. EXSOL[R]D 80) at an elevated temperature from 150 to 300° C. For this treatment, the fibres are introduced into a vessel, e.g. a glass flask, and heated to the required reaction temperature together with the arylsulphonic acid chloride and optionally a suspending agent (e.g. EXSOL[R]D 80) in an inert gas atmosphere (e.g. nitrogen), e.g. by means of a heating mantle, optionally with stirring. The surface reaction is then carried out for about 2 to 6 hours, preferably 2 to 4 hours at this temperature.

The pretreated fibres thus obtained contain arylsulphonic acid chloride chemically bound to the fibres. The fibres are then added to the reaction solution for the preparation of polyphenylenesulphide. During the reaction, the polyphenylenesulphide may be grafted on the fibres by a chemical reaction.

The reaction time may be up to 12 hours, preferably 1 to 9 hours. A stepwise increase in the reaction temperature during this time may be advantageous.

Working up of the reaction mixture and isolation of the fibre reinforced polyarylene sulphide may be carried out in known manner.

The fibre reinforced polyarylene sulphide may be separated from the reaction solution by the usual methods (for example, filtration or centrifuging) either directly or after the addition of e.g. water and/or diluted acids.

Filtration is generally followed by washing with water to remove inorganic constituents which may adhere to the polymer (e.g. residues of alkali metal sulphides and alkali metal chlorides.

The product may also be washed or extracted with other washing liquids, either in addition to or after the above-mentioned washing with water.

The fibre reinforced polymer may also be obtained by drawing off the solvent from the reaction chamber and then washing, as described above.

The fibre reinforced polyarylene sulphides according to the invention may in addition be mixed with other polymers, with pigments and fillers such as graphite, metal powders, glass powders, powdered quartz or glass fibres or the usual additives for arylene sulphides such as stabilizers and mould release agents by adding these substances and then mechanically mixing the components.

The fibre reinforced polyarylene sulphides according to the invention may be used, for example, as embedding masses for electrical parts, sealing rings, parts of office machinery and telecommunication equipment, etc.

EXAMPLE (a) Activation of carbon• fibres with arylsulphonic acid chlorides

Carbon fibres based on PAN still contain considerable quantities of hydrogen and nitrogen after graphitization (e.g. SIGRAFIL[R]SFC 0.5 contains about 0.4% by weight H and about 3.0% by weight N). Some of this hydrogen is present in the form of reactive hydrogen atoms which saturate carbon atoms present in faulty areas of the outer graphite layers of the fibres.

These hydrogen atoms may be reacted with a reactive electrophil under Friedel-Crafts conditions. p-Chlorosulphonic acid chloride has been used for this purpose. This compound is attached in a temperature resistant and chemically resistant form to the surface of the carbon fibres by a C-S bond.

EXPERIMENTAL METHOD 144.00 g of carbon fibres (SIGRAFIL[R]SFC 0.5) were first dried in an oil pump vacuum at 150° C. for 2.5 hours.

The fibres together with 9,50 g (=45 mmol) of p-chlorobenzene sulphonic acid chloride and 650 ml of EXSOL[R]D 80 (dried over a molecular sieve 4 Å) were then heated to the boiling point of the dispersing agent (about 215° C.) within 20 minutes with stirring in a 2-1 three-necked flask equipped with stirrer and reflux condenser. The contents of the flask were then stirred at this temperature for 4 hours. The experiment was carried out under a nitrogen atmospherre.

The fibres were finally filtered off, washed with toluene and acetone and dried in an oil pump vacuum at 100° C. for 4 hours.

(b) Preparation of polyphenylene sulphide in the presence of chemically activated fibres The following were introduced into a 1.4 1 stirrer autoclave to which a distillation bridge was attached: 129.00 g of sodium sulphide x $H_2O$ (=1 mol), 300 g of N-methylpyrrolidone, 57.00 g of sodium acetate x $H_2O$, 19.60 g of N,N-dimethylacetamide and 8.00 g of sodium hydroxide. The contents of the reactor were flushed with nitrogen and slowly heated to 160° C., when the sodium sulphide dissolved.

A mixture of water and N-methylpyrrolidone (96.95 g) was then distilled off over the distillation bridge. The temperature inside the reactor was 202° C. at the end of the distillation.

The reactor contents were then cooled to about 160° C. and 95.00 g of activated fibres, 148.5 g of 1,4-dichlorobenzene (=1.01 mol) and 0.68 g of 1,2,4-trichlorobenzene dissolved in 150.00 g of N-methylpyrrolidone were introduced into the reactor in countercurrent to the nitrogen. The resulting system was sealed under an initial nitrogen pressure of 3 kg/cm$^2$ at 160° C. and heated to 250° C. within 20 minutes (stirrer speed: 100 revs/min). The reactor was then kept at this temperature for 8 hours. The pressure was approximately 9.5 bar. The product was isolated in the usual manner by precipitation in methanol, acidification, washing with water to remove electrolytes, washing with acetone and drying. Yield: 92.3% of theoretical (based on the polymer)

It can be demonstrated, for example by raster electron microscopy, that the fibres are coated with a thin layer of the polymer.

We claim:

1. Fiber reinforced polyarylene sulphide which has been prepared in the presence of fibers chemically activated by pretreatment with arylsulphonic acid chlorides or halogenated arylsulphonic acid chlorides at elevated temperatures.

2. Fiber reinforced polyarylene sulphide according to claim 1 wherein the fibers are carbon fibers activated by contact with p-chlorobenzene sulphonic acid chloride at 150 to 300° C.

3. Process for the preparation of branched or unbranched fiber reinforced polyphenylene sulphides by reacting a mixture comprising (a) 50–100 mol-% of dihalogenated aromatic compounds corresponding to formula (I)

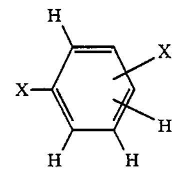

(I)

and 0-50 mol-% of dihalogenated aromatic compounds corresponding to formula (II)

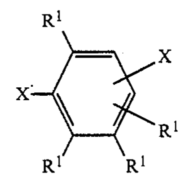

(II)

in which

X stands for halogen in the meta- or para-position to another X and the $R^1$, each of which is identical or different, stands for hydrogen, alkyl, cycloalkyl, aryl, alkylaryl or arylalkyl or two $R^1$s in the ortho-position to one another joined together form an aromatic or heterocyclic ring, with the proviso that one of $R^1$ is always different form hydrogen, and (b) 0.3 mol-%, based on the sum of the dihalogenated aromatic compounds of formulae I and II, of a tri- or tetrahalogenated aromatic compound corresponding to formula (III)

$$ArX_n \qquad (III)$$

wherein

Ar stands for an aromatic or heterocyclic group stands for a halogen, and n stands for 3 or 4, and (c) alkali metal sulphides, alone or in mixture with alkali metal hydroxides using a molar ratio of (a+b):c in the range of from 0.85:1 to 1.15:1, in an organic solvent wherein fibers which are chemically activated by pretreatment with arylsulphonic acid chlorides or halogenated arylsulphonic acid chlorides at elevated temperatures are added to the reaction mixture and the reaction is carried out at a temperature of from 160° C. to 320° C.

4. Process according to claim 3 wherein the fibers are carbon fibers pretreated with p-chlorobenzene sulphonic acid chloride.

5. Process according to claim 3 wherein X in formulae (I), (II) and (III) is chloro or bromo.

6. Process according to claim 3 wherein b) is 0.1 to 2.9 mol% based on the sum of compounds (I) and (II).

7. Process according to claim 3 wherein b) is 0.4 to 2.4 mol % based on the sum of compounds (I) and (II).

8. Process according to claim 3 wherein the reaction is in the presence of a catalyst.

* * * * *